Sept. 12, 1972 A. A. BERGH ET AL 3,690,965

SEMICONDUCTOR EPITAXIAL GROWTH FROM SOLUTION

Filed Nov. 29, 1971

3,690,965
SEMICONDUCTOR EPITAXIAL GROWTH FROM SOLUTION

Arpad Albert Bergh, Murray Hill, Carl Ralph Paola, Westfield, and Robert H. Saul, Scotch Plains, N.J., assignors to Bell Telephone Laboratories, Incorporated, Murray Hill and Berkeley Heights, N.J.
Filed Nov. 29, 1971, Ser. No. 202,837
Int. Cl. H01l 7/38
U.S. Cl. 148—172 14 Claims

ABSTRACT OF THE DISCLOSURE

Crystalline layers of Group III–V semiconductor materials are grown epitaxially from solution by a method which includes the isolation of small equal portions of solution from a solution reservoir. The portions in contact with the crystal substrate are constrained in a direction perpendicular to the substrate to be less than 3 millimeters thick before crystal growth is initiated by lowering the temperature of the substrate and its contacting solution. At the termination of growth, the depleted solution is removed from the grown layer leaving a surface sufficiently perfect to allow further processing without an intervening grinding or polishing operation.

BACKGROUND OF THE INVENTION

(1) Field of the invention

Epitaxial crystalline layers of Group III–V semiconductor materials are grown primarily for light-emitting device use.

DESCRIPTION OF THE PRIOR ART

The epitaxial growth of crystalline layers of Group III–V semiconductor materials has been extensively used in the production of such devices as light-emitting diodes. For this diode usage the techniques mostly widely employed for this crystalline growth, involve flowing a saturated solution of the semiconductor material in a metallic solvent into contact with a crystalline substrate and reducing the temperature of the solution-substrate system. Some of the earliest techniques employ a rotatable furnace which was tipped in order to cause the solution to flow from one portion of the growth container into another portion which contains the crystalline substrate. More recently other techniques employing sliding members have been developed in order to bring the saturated solution into contact with the substrate (U.S. Pat. Nos. 3,551,219; 3,560,276; 3,565,702).

Although layers grown by these methods are eminently suitable for many device uses, a recurring problem met in the growth of such crystalline layers has been the presence of surface irregularities and solvent inclusions. It is believed that these imperfections are due to convection currents and constitutional supercooling in the melt (Minden, Journal of Crystal Growth, 6, 228 [1970]). Before further processing can be performed on such crystalline layers grinding or polishing steps are often required. Theoretical and experimental studies of this problem have shown that these imperfections can be suppressed somewhat by maintaining a temperature gradient in the melt perpendicular to the substrate surface. Some further improvements have been realized by coupling such a temperature gradient with a reduction in the thickness of the solution layer. Donahue et al. (Journal of Crystal Growth, 7, 221 [1970]) report the development of a growth boat in which the saturated solution is caused to flow into a constricted area by the rotation of the boat. He reports that this constricted area cannot be less than approximately 3 mm. thick because the surface tension of the solution prevents its flow into the constricted area. They find crystalline surfaces produced in this boat somewhat improved, but they still observe ripples and ridges. In spite of improvements thus far obtained, the production of epitaxial layers with more perfect surfaces is a much sought after goal.

SUMMARY OF THE INVENTION

A method is presented here by which epitaxial layers of Group III–V semiconductor materials can be grown from solution with surfaces smooth, uniform and reproducible enough to be suitable for further processing without intervening grinding or polishing operations. The method developed is adaptable to quasi-continuous production. In this method small portions (aliquots) of saturated solution are metered out and isolated from a solution reservoir. Each aliquot is confined in a growth chamber in contact with the substrate to form a layer less than 3 mm. thick. The epitaxial layer is then grown by temperature reduction. This temperature reduction is accomplished either by reducing the temperature of the furnace or moving the growth chamber with its contents into a cooler region. For better thickness control the growth chamber is allowed to equilibrate at the lower temperature before the depleted solution is removed from the epitaxial layer. Otherwise layer growth is halted by the removal of the solution. Layers thus produced have shown a high degree of smoothness, thickness uniformity and crystalline perfection. Experimental growth systems in which the solution layer is 1 mm. or less in thickness have produced epitaxial growth with nearly all of the material coming out of solution being deposited on the substrate (close to 100 percent deposition efficiency). This leads to the production of epitaxial layers with a high degree of thickness reproducibility.

BRIEF DESCRIPTION OF THE DRAWING

The figure (*a* through *e*) is a series of elevational views in section of an exemplary crystal growth apparatus showing successive steps of the growth process.

DETAILED DESCRIPTION OF THE INVENTION

Solution growth

Figure 1A:
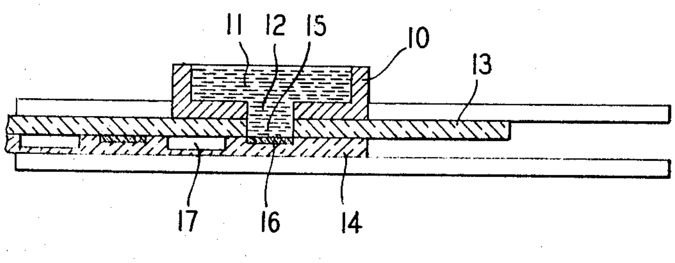
Figure 1B:
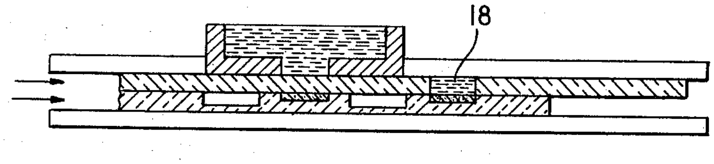

The epitaxial deposition of layers of the Group III–V semiconductor materials from a metallic solution is usually accomplished by the reduction of the temperature of the solution below the saturation point while the solution is in contact with a crystalline substrate. This method is widely used in the growth of layers of materials in the gallium phosphide-gallium arsenide family. When so produced these materials are grown from a saturated gallium solution doped with small quantities of donor or acceptor species or species selected to modify the luminescent properties of the resulting layer (Casey and Trumbore, Mat. Sci. Eng., 6,69 [1970]). The thickness of the grown layer depends upon the initial temperature at which the solution is saturated, the temperature drop through which growth takes place, the thickness of the solution layer over the substrate and the deposition efficiency. The deposition efficiency is the relationship between the amount of dissolved semiconductor material which is deposited on the substrate and the amount of dissolved material which is deposited on other parts of the growth apparatus. It is defined as the weight of material deposited on the substrate divided by the weight of material coming out of solution. Donor and acceptor dopants commonly used with GaP-GaAs semiconductors include Zn, Se and Te. Dopants which are sometimes included to modify the luminescent properties of the semiconductor materials when such materials are destined for light-emitting device use include O and N. These dopants can be dissolved in the growth solution from solid or liquid form or from a gas in the system atmosphere. The amount of gallium arsenide or gallium phosphide which will be deposited from a saturated gallium solution is readily calculatable from known data (Thurmond, J. Phys. Chem. Solids) C. (Thurmond, Journal of the Physics and Chemistry, J. Phys. Chem. Solids, 26, 785 [1965]). Table I shows the results of exemplary calculations of the epitaxial layer thickness of gallium phosphide which would be deposited from a saturated gallium solution when the temperature is reduced from the initial saturation temperature to the final growth temperature. The thickness calculation assumes uniform deposition over the substrate and 100 percent deposition efficiency. Table I also indicated what percentage of all of the gallium phosphide contained within the solution comes out of solution during deposition.

TABLE I.—EPITAXIAL DEPOSITION OF GaP FROM Ga SOLUTION

| Initial saturation temperature (° C.) | Final growth temperature (° C.) | Proportion of GaP deposited (percent) | Epitaxial layer thickness per mm. of solution layer thickness (micrometers) |
|---|---|---|---|
| 1,100 | 1,050 | 55 | 65 |
| 1,030 | 1,012 | 20 | 8 |
| 1,030 | 955 | 50 | 21 |
| 950 | 900 | 25 | 5 |

Exemplary growth apparatus

FIG. 1 shows an exemplary apparatus for epitaxial layer growth in accordance with the invention. In this apparatus the measuring out and isolating of the small equal portions (aliquots) of solution is accomplished by the manipulation of sliding members. The solution reservoir 10 contains a quantity of solution 11 maintained at or near its saturation temperature. The reservoir 10 has an orifice 12 at the bottom. Supported against the reservoir 10 there is an upper sliding member 13 and a lower sliding member 14. The thickness of the upper sliding member 13 is selected to be the thickness of the aliquot desired and it is provided with an orifice 15 approximately the same size as the substrate 16 upon which deposition is to take place. Substrate 16 lies within a depression in the lower sliding member 14 with the upper surface of the substrate 16 somewhat below the plane of the upper surface of the lower sliding member 14. The lower sliding member 14 is also supplied with a dump well 17 which will receive the depleted solution after deposition. FIG. 1*a* shows the two sliders in position below the reservoir orifice 12. The aliquot 18 is isolated from the reservoir by moving the two slider members 13, 14 to the right as shown in FIG. 1*b*.

Figure 1C:
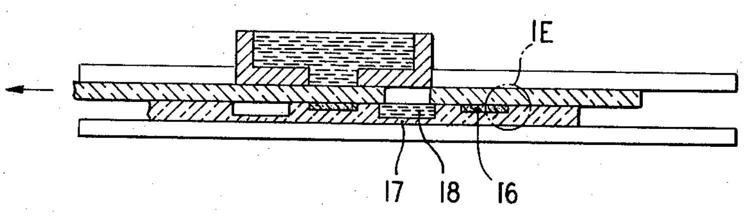
Figure 1D:
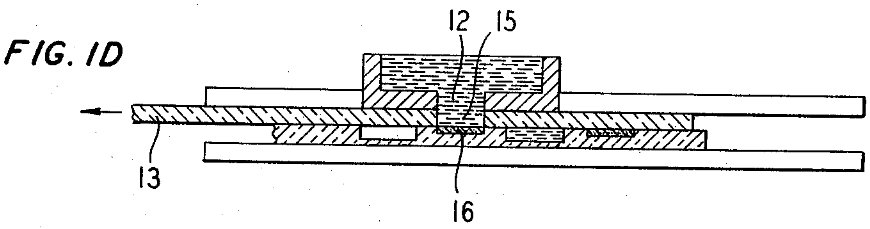
Figure 1E:
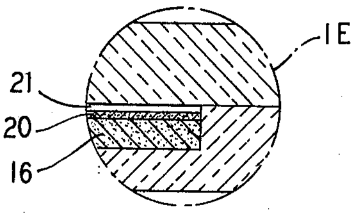

Crystal growth can be initiated in one of two ways. Either the temperature of the whole apparatus can be reduced or the displacement of the upper and lower sliders 13, 14 can be such as to bring the aliquot 18 and substrate 16 to a region of lower temperature. In either case the temperature of the aliquot and substrate 16, 18 is reduced to the final growth temperature. Growth can be terminated at any time by the removal of the aliquot from contact with the substrate 16 (as illustrated in FIG. 1*c*) of the aliquot can be held at the final growth temperature for a sufficient time to allow equilibration and the deposition to reach completion. In either case the depleted solution is removed from contact with the substrate 16 and its grown layer 20 by sliding the upper sliding member 13 to the left relative to the lower sliding member 14 to bring the depleted aliquot 18 over and into the dump well 17. If the clearance 21 of the upper surface of the epitaxial layer 20 is less than approximately 75 micrometers, the surface tension of the gallium solution in the aliquot 18 will be sufficient to hold the aliquot together and result in essentially complete removal of the liquid from the surface of the layer 20. Other removal methods are possible such as the use of a forceful gas stream. Equilibration in most cases is accomplished within 15 minutes of the time that the apparatus surrounding the substrate 16 and the aliquot 18 is brought to the final growth temperature.

In the quasi-continuous production process illustrated, growth of the next epitaxial layer on the succeeding substrate 19 is initiated (FIG. 1*d*) by moving the upper sliding member 13 further to the left, bringing the orifice 15 in that member 13 to a position underneath the reservoir orifice 12 and over the succeeding substrate 16. If epitaxial layer growth has been initiated by the reduction of the temperature of the entire system, the system must be brought back to the initial starting temperature before the cycle is started again in this manner. By successive repetitions of the steps illustrated in FIGS. 1*a* through 1*d* epitaxial layers can be grown on succeeding substrates until the succeeding aliquots have emptied the reservoir 10 of its contained solution 11. The apparatus can also be arranged to grow layers on several substrates in tandem. Epitaxial layers can be deposited on top of layer 20 by placing additional solution reservoirs to the right of reservoir 10 and by extending the upper sliding member 13 beneath such additional reservoirs. The upper sliding member 13 must also include appropriate orifices similar to orifice 15. In that case, of course, the dump well 17 must be made large enough to accommodate all of the aliquots used in the deposition of succeeding layers on substrate 16.

In addition to the advantages accruing from the use of the general method outlined above, the use of each of the two principal temperature reduction schemes, has its own particular advantage. If the temperature of the entire apparatus is reduced in order to institute layer growth, substrate 16 need not be displaced far from reservoir 10 and a fairly compact growth apparatus results. If the temperature reduction is to be accomplished by removing the substrate 16 and aliquot 18 to a cooler region of the apparatus a larger displacement is required. However, the cycling time is reduced because the reservoir 10 remains at a constant temperature and time need not be spent waiting for the apparatus to reequilibrate at the initial starting temperature.

Examples

An apparatus for layer growth in accordance with the invention was constructed principally of graphite and epitaxial layers of gallium phosphide were grown on gallium phosphide substrates using the temperature reduction method in which the temperature of the entire system is reduced. Layers were grown using the temperatures and aliquot layer thickness of Table II. Table II also indicates the thickness of the grown layer and the achieved deposition efficiency. The layers produced in each of these examples were smooth and uniform enough for further processing without the requirement of grinding or polishing of the surface. The further processing contemplated includes the deposition of additional layers, the application of electrical contacts, the diffusion of additional electrical active impurities and the application of photolithographic masking techniques.

TABLE II

| Aliquot thickness (millimeters) | Temperature interval (° C.) | Grown layer thickness (micrometers) | Deposition efficiency (percent) |
|---|---|---|---|
| 0.5 | 1,030–955 | 11 | ~100 |
| 1 | 1,030–955 | 21 | ~100 |
| 2 | 1,030–955 | 32 | 75 |
| 3 | 1,030–1,012 | 12 | 55 |

It is to be noted from Table II, that, at an aliquot thickness of 3 millimeters, the deposition efficiency is rapidly decreasing. Since low deposition efficiency adversely affects both the economics and the reproducibility of the process, the use of aliquot thickness greater than 3 millimeters is not recommended. On the other hand thicknesses of 1 millimeter or less produce essentially 100 percent deposition efficiency and are, thus, preferred.

What is claimed is:

1. Method for the production of a semiconductor device including the epitaxial growth of a thin crystalline layer of a semiconductor material on a crystalline substrate from solution characterized in that the method comprises:

(a) contacting the substrate with a solution reservoir containing a solution of the semiconductor materials while the solution reservoir is maintained at a solution temperature;

(b) isolating a portion of the solution in contact with the substrate within a growth chamber constrained in the thickness direction so as to form a solution layer not greater than 3 millimeters thick;

(c) reducing the temperature of the growth chamber to a final temperature during a growth time, during which growth time the thin crystalline layer forms on the substrate; and (d) removing the depleted solution from the crystalline layer.

2. Method of claim 1 in which the growth chamber is moved away from the reservoir during the growth time so that the temperature reduction of the growth chamber is independent of the temperature of the reservoir.

3. Method of claim 2 in which the temperature of the reservoir remains essentially constant at the solution temperature during the growth time.

4. Method of claim 1 in which the depleted solution is removed from the crystalline layer while the growth chamber is at the final temperature.

5. Method of claim 4 in which the growth time is sufficiently long to allow the growth chamber and its contents to come essentially to thermal equilibrium before the depleted solution is removed.

6. Method of claim 1 in which the solution layer is not greater than 1 millimeter thick.

7. Method of claim 1 in which the temperature of the solution layer is essentially uniform in the thickness direction during the growth time.

8. Method of claim 1 in which the portion of the solution is isolated by moving a first slider and a second slider together relative to the solution reservoir.

9. Method of claim 8 in which the depleted solution is removed from the crystalline layer by moving the second slider relative to the first slider.

10. Method of claim 9 in which the clearance between the lower surface of the second slider and the upper surface of the crystalline layer is less than 75 micrometers.

11. Method of claim 8 in which the depleted solution is removed from the crystalline layer by means of a gas stream.

12. Method of claim 1 in which the thin crystalline layer is contacted with a second solution reservoir and a second crystalline layer is formed from a second isolated portion of solution.

13. Method of claim 1 in which an electrical contact is applied to the crystalline layer, which crystalline layer is in the as-formed state.

14. Method of claim 1 in which photolithographic processing is performed on the crystalline layer, which crystalline layer is in the as-formed state.

References Cited

UNITED STATES PATENTS

| | | | |
|---|---|---|---|
| 3,551,219 | 12/1970 | Panish et al. | 148—171 |
| 3,560,276 | 2/1971 | Panish et al. | 148—171 |
| 3,565,702 | 2/1971 | Nelson | 148—172 |

GEORGE T. OZAKI, Primary Examiner

U.S. Cl. X.R.

148—171; 117—201; 252—62.3 GA